US012210224B2

(12) United States Patent
James (10) Patent No.: US 12,210,224 B2
(45) Date of Patent: Jan. 28, 2025

(54) OPHTHALMIC SOLUTIONS HAVING VISUAL MARKER FOR SAFER CONTACT LENS INSERTION AND REMOVAL

(71) Applicant: Neena Singhal James, Huntsville, AL (US)

(72) Inventor: Neena Singhal James, Huntsville, AL (US)

(73) Assignee: Neena Singhal James, Huntsville, AL (US)

( * ) Notice: Subject to any disclaimer, the term of this patent is extended or adjusted under 35 U.S.C. 154(b) by 1367 days.

(21) Appl. No.: 16/696,933

(22) Filed: Nov. 26, 2019

(65) Prior Publication Data

US 2020/0174282 A1 Jun. 4, 2020

Related U.S. Application Data

(60) Provisional application No. 62/772,889, filed on Nov. 29, 2018.

(51) Int. Cl.
| | |
|---|---|
| *A61F 2/95* | (2013.01) |
| *B29D 11/00* | (2006.01) |
| *B29D 11/02* | (2006.01) |
| *C11D 3/00* | (2006.01) |
| *C11D 3/20* | (2006.01) |
| *G02C 7/04* | (2006.01) |

(52) U.S. Cl.
CPC .......... *G02C 7/04* (2013.01); *B29D 11/00913* (2013.01); *B29D 11/023* (2013.01); *C11D 3/0078* (2013.01); *C11D 3/2096* (2013.01)

(58) Field of Classification Search
CPC ........ G02C 7/04; G02C 13/00; G02C 13/008; C11D 3/2096; C11D 3/0078; A61F 2/95; A61F 2/958
See application file for complete search history.

(56) References Cited

U.S. PATENT DOCUMENTS

| | | |
|---|---|---|
| 5,100,225 A | 3/1992 | Rothe |
| 7,982,056 B2 * | 7/2011 | Bydlinski ............ C07D 311/82 549/223 |
| 8,388,131 B2 | 3/2013 | Heacock et al. |
| 8,663,998 B2 | 3/2014 | Heacock et al. |

(Continued)

OTHER PUBLICATIONS

International Search Report and Written Opinion, PCT/US2019/063444 mailed Feb. 3, 2020.

(Continued)

*Primary Examiner* — Vi X Nguyen
(74) *Attorney, Agent, or Firm* — MASCHOFF BRENNAN (57) ABSTRACT

A method of applying a contact lens to an eye of a subject can include: applying an ophthalmic composition to the contact lens, wherein the ophthalmic composition includes a colorant that temporarily colorizes the contact lens; and positioning the colorized contact lens onto a correct position of the eye while visualizing the colorized contact lens. A method of removing a contact lens from an eye of a subject can include: applying an ophthalmic composition to the contact lens while located on the eye of the subject, wherein the ophthalmic composition includes a colorant that temporarily colorizes the contact lens; and removing the colorized contact lens from the eye while visualizing the colorized contact lens.

20 Claims, 1 Drawing Sheet

(56) References Cited

U.S. PATENT DOCUMENTS

| | | |
|---|---|---|
| 8,702,816 B2 | 4/2014 | Conte |
| 8,785,360 B1 | 7/2014 | Herrick et al. |
| 8,911,080 B2 | 12/2014 | Spaulding et al. |
| 2012/0091368 A1* | 4/2012 | Conte .................. D06P 1/0012 252/301.16 |

OTHER PUBLICATIONS

Canada Intellectual Property Office; First Office Action issued in CA App. No. 3,121,477 dated Jul. 28, 2022; 7 pages.

* cited by examiner

OPHTHALMIC SOLUTIONS HAVING VISUAL MARKER FOR SAFER CONTACT LENS INSERTION AND REMOVAL

CROSS-REFERENCE

This patent application claims priority to U.S. Provisional Application No. 62/772,889 filed Nov. 29, 2018, which provisional is incorporated herein by specific reference in its entirety.

BACKGROUND

Field

The present disclosure relates to compounds and/or materials for use in ophthalmic solutions with visual markers. More particularly, the present disclosure relates to an ophthalmic solution having a visual marker for facilitating contact lens insertion and removal.

Description of Related Art

There is a trend to meet the needs of patients by fitting more and more patients in contact lenses. Fear of difficulty in handling the contact lenses, improper insertion, and removal often hinders patients from trying and/or succeeding with contact lenses. Two of the largest demographics of new contact lens wearers are children and patients 40 years and older who are now having trouble reading. These demographics can typically experience more reservations and difficulty with learning contact lens insertion and removal techniques. Patients with hyperopia and presbyopia in particular have difficulty seeing small clear contact lenses, which can be problematic and cause the patent to forego use of contact lenses and increase contact lens related injuries.

Parents may be more receptive to the idea of contacts for children if they have proper training or improved techniques to help their child in the learning process and ensure proper insertion and removal by their child in order to comply with the doctor's instructions.

Many contact lens users experience difficulty with inserting or removing lenses, where even the most experienced wearers occasionally experience trouble with inserting or removing lenses. Also, fear of not being able to tell if they did in fact remove their lens successfully is also problematic for patient compliance. Factors such as prolonged time on computers and cell phones as well as the rising prevalence of dry eye disease can contribute to the increasing difficulty of contact lens removal.

Therefore, there is a need for improved contact insertion and removal protocols as well as systems to facilitate the insertion and removal.

SUMMARY

In some embodiments, a method of applying a contact lens to an eye of a subject can include: applying an ophthalmic composition to the contact lens, wherein the ophthalmic composition includes a colorant that temporarily colorizes the contact lens; and positioning the colorized contact lens onto a correct position of the eye while visualizing the colorized contact lens. The solution and colorant are safe for at home use in the eyes.

In some embodiments, a method of removing a contact lens from an eye of a subject can include: applying an ophthalmic composition to the contact lens while located on the eye of the subject, wherein the ophthalmic composition includes a colorant that temporarily colorizes the contact lens; and removing the colorized contact lens from the eye while visualizing the colorized contact lens.

A method of inspecting a location of a worn contact lens can include: applying an ophthalmic composition to the contact lens while located on the eye of the subject, wherein the ophthalmic composition includes a colorant that temporarily colorizes the contact lens; identifying a location of the colorized contact lens on the eye while visualizing the colorized contact lens; and determining whether or not the contact lens is in a proper location on the eye. If the contact lens is in a proper location, the subject continues to wear the contact lens in the proper location. If the contact lens is in an improper location, the subject relocates the colorized contact lens until in the proper location while visualizing the colorized contact lens. Also, the subject can use the ophthalmic composition in the eye to see if the contact lens has been successfully removed, by visually determining that the eye no longer has the contact lens.

A method of inspecting a contact lens before applying a contact lens to an eye of a subject can include: applying an ophthalmic composition to the contact lens, wherein the ophthalmic composition includes a colorant that temporarily colorizes the contact lens; visually inspecting the colorized contact lens; and if the colorized contact lens is without damage, positioning the colorized contact lens onto a correct position of the eye while visualizing the colorized contact lens; or if the colorized contact lens is damaged, discarding the colorized contact lens.

In some embodiments, a kit for use in the methods described herein can include: an ophthalmic composition having a colorant in an eye drop dispensing container; and instructions for implementing a method for applying a colorized contact on an eye or for removing a colorized contact from an eye.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and following information as well as other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the FIGURES, can be arranged, substituted, combined, separated, and designed in a wide variety of different configurations, all of which are explicitly contemplated herein.

Generally, the present technology relates to compositions, systems, and methods for improving protocols for applying contact lenses onto eyes, confirming correct location of the contact lens while wearing the same, inspecting a contact lens for damage, and removal of the contact lenses from the eyes of subjects. The compositions can include a visual marker, such as a colorant, that can help visualize the contact lens during insertion or removal. The systems can include the compositions as well as containers for storing the compositions and using the compositions with the contact lenses as well as other articles. The method can include using the composition to help the subject locate the contact lens during insertion and removal from the eye. Other features of the present invention are outlined herein.

In some embodiments, the composition with the visual marker can include an ophthalmic solution that is configured for use with a contact lens and that is suitable for application to an eye, directly or indirectly. The composition can include contact lens care solutions and eye drops, or other composition that is suitable for ophthalmic use. The visual marker can include a colorant that can interact or associate with a contact lens so that the colorized contact lens has some coloring for improved identification, location, and handling compared to clear contact lenses. This colorant can be applied by the ophthalmic composition to the contact lens, either directly or indirectly so that the colorant associates with the material of the contact lens. The colorant can be configured so that it does not adhere, bond, or otherwise couple with the contact lens, and thereby does not covalently bond for permanent association with the contact lens material. Instead, the colorant is configured for temporary association with the contact lens material so that the colorant can be easily removed from the contact lens material either with natural tear washing or by a manual wash with an eye drop, contact lens care solution, or any other cleansing ophthalmic composition.

The colorant can be configured so that it is present in the ophthalmic composition in an amount to help distinguish the contact lens from solution or background in order to help identify the contact lens. The colorant is not present in an amount to color the contact lens in a way that colors the optical visualization of the eye, where when colorized or washed the eye having the contact lens can still see normal color variations and gradations. As such, the colorant can be selected to provide a light coloring to the contact lens to distinguish the boundaries of the body of the contact lens without permanently coloring the contact lens. The colorant can provide temporary shading, tinting, or light coloring for visual identification and distinguishing the contact lens from compositions, fingers, containers, other things or backgrounds from which a completely clear contact lens may visually blend in with.

In some embodiments, the colorant is an ophthalmic colorant that is suitable and approved for application to an eye or for being included in an ophthalmic composition. The colorant can be a stain or dye that provides temporary association with the contact lens, but that can also be washed from the contact lens by tear washing or manual solution washing. In some aspects, the colorant can be any vital stain, which is approved for ophthalmic use. The colorant can be selected from fluorescein, lissamime green, rose bengal, or ophthalmically-acceptable salt or derivative thereof. Other examples may include blue dye trypan blue, indoxyanine green, brilliant blue, as well as others. In some aspects, the colorant can be an azo colorant, such as trypan blue or diazine green. In some aspects, the colorant can be an arylmethane, such as gentian violet, bromophenol blue, patent blue, brilliant blue, light green (i.e., lissamine green), fast green, or others. In some aspects, the colorant can be a cyanine dye, such as indocyanine green or infracyanine green, or others. In some aspects, the colorant can be a thiazine dye, such as methylene blue or toluidine blue, or others. In some aspects, the colorant can be a xanthene dye, such as fluorescein, rose bengal, or others. In some aspects, the colorant is preferable fluorescein.

The colorant, such as described herein, can be present at various concentrations, but should be included in amounts that do not pertinently stain or color the contact lens. As such, the concentration of the colorant in the ophthalmic composition depends directly on the properties of the colorant. Accordingly, the suitable ophthalmic composition can include the colorant being configured to a temporary color (e.g., dye or stain) the contact lens without bonding or permanently coloring the contact lens. As defined herein, the concept of temporarily coloring a contact lens should be interpreted as only providing coloring so that the contact lens is visible without actually coloring the contact lens. That is, the colorant does not absorb onto or into the contact lens or penetrate into the body of the contact lens at all or for any significant duration. In suitable embodiments, the colorant can provide temporary coloring for the contact lens that is washed away by tear washing or washing with an ophthalmic composition so that the contact lens appears to be colored for a time period up to about 20 seconds, 30 seconds, 40 seconds, 50 seconds, 60 seconds, 2 minutes, 5 minutes, 10 minutes, 15 minutes, 20 minutes, 25 minutes or up to and less than 30 minutes with or without washing. Preferably, washing, whether by tears or ophthalmic composition instantaneously removes the colorant from the contact lens, or removes the colorant within a time period up to about 20 seconds, 30 seconds, 40 seconds, 50 seconds, 60 seconds, 2 minutes, 5 minutes, 10 minutes, 15 minutes, 20 minutes, 25 minutes or up to and less than 30 minutes.

The ophthalmic composition with the suitable colorant in a beneficial concentration for the uses and conditions described herein can be used in methods for safer contact lens insertion and removal with respect to the eye. The use of the ophthalmic composition during insertion protocols and/or removal protocols can reduce the chance of damaging the eye because the contact will be temporarily visually distinguishable by the colorant associating temporarily with the contact lens. Specifically, the protocols can reduce the risk and/or occurrence of contact lens wear drop out, corneal abrasions, scarring, ulcer, subconjunctival hemorrhages, conjunctival lacerations, infections, or other ophthalmic problems that may arise from improper contact lens insertion or removal, as well as accidentally over wearing lenses or having persistent lens fragments in the eye. Many contact lens complications can be avoided by using the ophthalmic compositions in accordance with the protocols described herein.

In some embodiments, the use of beneficial dye/stain compounds in the ophthalmic compositions can be advantageously applied to the eye of a subject, in particular persons, inserting, wearing, or removing contact lenses, in order to effectively prevent damage to the eye/cornea. The ophthalmic compositions can avoid adverse consequences that may arise from improperly inserting, wearing, or removing contact lens, as well as accidentally over wearing lenses or having persistent lens fragments in the eye.

In some aspects, the ophthalmic compositions (e.g., preferably a solution) having the colorant can be configured as contact lens care solutions and/or eye drops or other, that can be applied to the contact lens and/or eye of a subject. The ophthalmic composition can be applied directly to the contact lens or to the eye of a subject wearing contact lenses to effectively prevent damage to the eye/cornea by allowing visualization of the contact lens so that a protocol can be performed to avoid improperly inserting or removing such contact lens by being able to identify the contact lens by visual analysis, even when the eye needs a contact lens for visual clarity. That is, the subject needing the contact lens for visual clarity can still see the contact lens when outside of the eye when treated with the contact-coloring ophthalmic composition. Eye drops of the ophthalmic composition can be applied to the eye in order to determine whether or not there is a contact lens in the eye, which can be used to inhibit a subject from accidentally over wearing contact lenses or accidently trying to apply a contact lens to an eye already having a contact lens thereon. Also, the eye drops can be applied to the eye to see if there are any contact lens fragments, such as from a torn or otherwise damaged contact lens, in order to avoid the subject having persistent contact lens fragments that may remain in the eye after tearing or damaging of such contact lens. The eye drops can also be helpful to temporarily provide coloring so that the contact lens can be more easily visualized for removal of the contact lens from the eye.

In some embodiments, in addition to the colorant the ophthalmic compositions can include various compounds, polymers, or other components that are normally present in ophthalmic compositions, such as contact lens care solutions or eye drops, as well as other types suitable for use with eye drops or contacts. Contact lens care solutions can be discriminated from eye-drops as the latter is not directed to the treatment of contact lenses, but intended for direct application of a drop in the eye. The contact lens care solutions or eye drops can effectively be used as a medium for carrying a colorant as described herein, such as the temporary dye or stain for the contact lens, preferably fluorescein. In some aspects, the ophthalmic composition can include an ophthalmically acceptable carrier to carry the colorant in the composition, such as a water soluble polymer, zwitter ionic substance, amphoteric substance, or other substance. In some aspects, the ophthalmic composition includes an anesthetic, such as proparacaine or other.

In some embodiments, the ophthalmic composition can include a compound that temporarily stiffens the contact lens for application or removal. This can make the contact lens less flimsy by temporarily increasing the modulus of elasticity. The lens may then later return to being flimsy. The protocol does not change the oxygen permeability of the contact lens.

In some embodiments, the ophthalmic composition can be configured so that it does not stain skin, which can include the colorant being fluorescein.

It should be recognized that the contact lens may absorb the colorant into the body thereof, such as into pores. However, tear cleansing or a washing eye drop or contact care solution can be used to remove the colorant from the contact lens.

While specifically formulated contact lens care solutions can be configured for use in facilitating improved contact lens insertion, eye drops configured as described herein may be also used for application to the contact lens prior to insertion. In some aspects, it is preferable that the ophthalmic composition is an eye drop solution that can be applied directly to the contact lens or eyes when inserting or removing the contact lenses.

It was surprisingly found that damage prevention to the eye/cornea can be achieved by the use of the temporary colorant (e.g., fluorescein or others) in a contact lens care solution or eye drop used as described herein. Fluorescein has traditionally been used for eye/cornea staining and as a diagnostic tool in the field of ophthalmology and optometry, where topical fluorescein is used in the diagnosis of corneal abrasions, corneal ulcers and herpetic corneal infections. Now, however, fluorescein can be used to temporarily color, tint, shade or otherwise provide improved optical viewability to a colorized contact lens for improved insertion, removal, inspection, location, cleaning or any handling of the contact lens.

Fluorescein is a manufactured organic compound and dye. It is available as a dark orange/red powder slightly soluble in water and alcohol. It is widely used as a fluorescent tracer for many applications. Fluorescein absorbs blue light, with peak absorption and excitation occurring at wavelengths between 465-490 nm. Fluorescence occurs at the yellow-green wavelengths of 520-530 nm. Fluorescein chemical formula is $C_{20}H_{12}O_5$ with molecular weight of 332.31 g/mol. The ophthalmically acceptable salt fluorescein sodium has a chemical formula of $C_{20}H_{10}Na_2O_5$ with molecular weight: 376.275 g/mol. All chemical variants and commercial names for fluorescein are included in this document, including, but not limited to, fluorescein, fluorescein sodium, fluorescein disodium salt, and uranine.

Manufacturing of fluorescein, and for the application of fluorescein in the field of ophthalmology and optometry can be found in U.S. Pat. No. 7,982,056, which teaches how to prepare pure fluorescein, while U.S. Pat. No. 9,232,889 B2 teaches how fluorescein is used for ocular surface imaging.

In some embodiments, the fluorescein is comprised in the eye drop solution in a concentration of between 0.01-25% by weight. As part of an eye drop solution, the eye drop solution may have other active and non-active ingredients capable of providing drugs or lubrication to the eye, or other functions by direct application to the eye.

In some embodiments, the fluorescein is comprised in the contact lens care solution in a concentration of between 0.01-25% by weight. As part of the contact lens care solution embodiment, the lens care solution is a multipurpose solution capable of disinfecting, cleaning, and rinsing a contact lens or other functions by direct application to the contact lens.

In some embodiments, the contact lens can be cleansed prior to storage, and then stored in a clear composition that excludes the colorant.

While the present ophthalmic composition can be used by any subject, whether human or non-human, of any age, the ophthalmic composition can be specifically used by subjects that are new to wearing contact lenses. Demographics of new contact lens wearers often include children under age 18 and adults 40 years and older who are having trouble reading. These demographics in particular can experience more reservations and difficulty with learning contact lens insertion and removal. The chances for incorrectly inserting the contact lenses into the eye, folding/tearing of contact lenses, or otherwise incorrect handling of contact lenses are high for all subjects, but especially for these demographics. Even the most experienced contact lens wearers occasionally experience trouble with removing lenses or that moment of fear not being able to tell if they did in fact remove their contact lens successfully. Although experienced patients tend to do better with this task, it may cause damage to the eye and cornea in the learning process, and/or patients may stop using contact lenses altogether. From observing patients in a clinical practice, we have learned that patients with hyperopia and presbyopia in particular have great difficulty seeing small clear contact lenses. Now, the ophthalmic compositions with the colorant (e.g., temporary dye) can be applied to the contact lens or eye right before insertion or removal of the contact lens, which can significantly improve the subject's handling of the contact lenses, and therefore improve the confidence in using such contact lenses. Now, the medical benefits of using a contact lens dye can be used in clinical practice or at home or anywhere outside of an eye doctor's office so as to reduce the risk and occurrence of contact lens wear drop out, corneal abrasions, scarring, ulcer, subconjunctival hemorrhages, conjunctival lacerations, infections, or other from improper contact lens insertion or removal.

In some embodiments, an ophthalmic composition can include a dye or stain that may color the contact lens temporarily for safer insertion/removal of said contact lens or persistent lens fragments. In some aspects, the dye is fluorescein, however, other ophthalmically acceptable dyes can be used such as Lissamime Green or Rose Bengal. In some aspects, the ophthalmic composition is a contact lens care solution or an eye drop solution, preferably an eye drop solution. In some aspects, the ophthalmic composition is an eye drop solution, and wherein said eye drop solution comprises 0.01-25% fluorescein (% by weight) or other dye. In some aspects, the ophthalmic composition is a contact lens care solution comprising 0.01-25% fluorescein (in weight %, based on the total contact lens solution composition) or other dye. In some aspects, the ophthalmic composition can include any ophthalmically acceptable active ingredient(s), including but not limited to steroids, antihistamines, nonsteroidal anti-inflammatory drugs, antibiotics, anesthetics, lubricating and tear-replacing solutions, preservatives, germicides, disinfectants, salts, and/or buffers.

In some embodiments, methods of use are provided for applying an ophthalmic composition having a colorant (e.g., dye, such as fluorescein) to a contact lens so as to temporarily colorize the contact lens; and handling the temporarily colorized contact lens. The ophthalmic composition can be a contact lens care or eye drop solution. The application to the contact lens can be performed with the objective to color the contact lens temporarily for safer insertion or removal of said contact lens or identify persistent lens fragments or other handling of the contact lens. In some aspects of the method, the colorant is fluorescein, which is located in the contact lens care solution or eye drop in a concentration of between about 0.01-25% by weight. In some aspects, the method of use can result in effectively preventing damage to the eye/cornea by avoiding consequences of improperly inserting or removing such contact lens, accidentally over wearing lenses or persistent lens fragments. Visualization of the contact lens with the colorant can substantially improve ease of handling and use of the contact lens. In some aspects, the ophthalmic composition has the colorant at a concentration of about 0.01% to 25%, or 0.05% to 20%, or 0.1% to 15%, or 0.5% to 10%, or 0.75% to 5%, or 1% to 2%.

In some embodiments, a pharmaceutical composition is provided with a dye, preferable fluorescein, wherein the pharmaceutical composition is suitable for administration to the eye, preferably wherein the pharmaceutical composition is in the form of a contact lens care solution or an eye drop.

Specifically, the current invention will reduce the risk and occurrence of contact lens wear drop out, corneal abrasions, scarring, ulcer, subconjunctival hemorrhages, conjunctival lacerations infections, or the like from improper contact lens insertion or removal, accidentally over wearing lenses or due to persistent lens fragments that may remain in the eye after tearing of such contact lenses.

Parents will be more receptive to the idea of contacts if they have the option of an eye drop to both help their child in the learning process and ensure proper removal by their child to comply with the eye doctor's instructions.

In some embodiments, a method of applying a contact lens to an eye of a subject can include: applying an ophthalmic composition to the contact lens, wherein the ophthalmic composition includes a colorant that temporarily colorizes the contact lens; and positioning the colorized contact lens onto a correct position of the eye while visualizing the colorized contact lens. In some aspects, common contact lens activities may be performed with the colorized contact lens, such as: washing hands of the subject; placing the lens on a finger tip of the subject; opening the eye of the subject; looking at the eye of the subject with a mirror; looking up by the subject; placing the colorized contact lens on the eye; placing the colorized contact lens on a white portion of the eye; looking down; blinking after application of the colorized lens; and/or centering the colorized contact lens on the eye. In some aspects, the methods can include obtaining the contact lens when un-colorized; and colorizing the contact lens outside of the eye. In some aspects, the methods can include applying the colorized contact lens onto the eye while visualizing the colorized contact lens. In some aspects, the methods can include providing or obtaining or making the ophthalmic composition having the colorant. In some aspects, the methods can include dispensing the ophthalmic composition from an ophthalmic composition dispensing container. In some aspects, the ophthalmic composition is configured as an eye drop configured to be applied directly to an eye. In some aspects, the ophthalmic composition is configured as a contact lens care solution configured to be applied directly to a contact lens.

In some embodiments, the colorant is an FDA approved colorant for ophthalmic use. In some aspects, the colorant is an azo colorant, arylmethane colorant, cyanine colorant, thiazine colorant, xanthene colorant, or combination thereof. In some aspects, the colorant is selected from trypan blue, diazine green, gentian violet, bromophenol blue, patent blue, brilliant blue, light green (i.e., lissamine green), fast green, indocyanine green or infracyanine green, methylene blue, toluidine blue, fluorescein, rose bengal, or combination thereof. In some aspects, the colorant is selected from fluorescein, rose bengal, lissamine green, or combinations thereof. In some aspects, the colorant is fluorescein.

In some embodiments, the methods can include: providing the un-colorized contact lens in a contact lens carrier container; applying the ophthalmic composition to the contact lens in the contact lens carrier container; and colorizing the contact lens with the ophthalmic composition. In some aspects, the methods can include: obtaining a contact lens carrier container having the colorized contact lens; and retrieving the colorized contact lens from the contact lens carrier container. In some aspects, the methods can include: providing the un-colorized contact lens in a contact lens carrier container; retrieving the un-colorized lens from the contact lens carrier container; and colorizing the contact lens outside of the contact lens carrier container. In some aspects, the methods can include applying the ophthalmic composition to the contact lens while the contact lens is on a palm, fingertip, or other body portion of the subject.

In some embodiments, the ophthalmic composition is at least one of: sterile, about pH neutral, isotonic, or otherwise configured for ophthalmic use.

In some embodiments, the methods can include performing the method under guidance of an ophthalmic professional. In some aspects, the methods can include performing the method under guidance of instructions provided with the ophthalmic composition. In some aspects, the methods can include performing the method at home, office, restroom, or anywhere outside of an eye doctor's office.

In some embodiments, the methods can include: applying cleansing eye drops into the eye having the colorized contact lens; and washing the colorant from the contact lens with the cleansing eye drop to obtain a non-colorized contact lens on the eye. In some aspects, the methods can include blinking after the colorized contact lens is on the eye so as to cleanse the colorant from the contact lens to obtain a non-colorized contact lens on the eye. In some aspects, the non-colorized contact lens outside of the eye is unseen, and then the method can include applying the ophthalmic composition to a location and colorizing the contact lens for visualization to find the contact lens.

In some embodiments, the methods can include visually inspecting the contact lens for defects when the colorized contact lens is outside of the eye. In some aspects, the methods can include discarding the colorized contact lens when visually determining a defect. In some aspects, the methods can include retaining, saving, storing, or using the contact lens when visually determining the colorized contact lens to be substantially free of visibly determinable defects.

In some embodiments, the methods can include visualizing the colorized contact lens on the eye after placement and determining the colorized contact lens is properly placed. In some aspects, the methods can include visualizing the colorized contact lens on the eye after placement; determining the colorized contact lens is improperly placed; and relocating the colorized contact lens on the eye so as to be properly placed by visualization of the colorized contact lens.

In some embodiments, a light device can be used to help visualize the colorized contact lens. In some aspects, the methods can include: shining a light on the colorized contact lens; and visualizing the colorized contact lens with the light. In some aspects, the methods can include: determining a wavelength of light that illuminates the colorized contact lens; and shining the light having the illuminating wavelength on the colorized contact lens. In some aspects, the methods can include: obtaining a light that emits a wavelength that illuminates the colorized contact lens; and shining the light having the illuminating wavelength on the colorized contact lens; and visualizing the colorized contact lens with the light, wherein the light has a wavelength of between 465-490 nm or 520-530 nm. The light can have the wavelength that is appropriate for the colorant.

In some embodiments, the methods can include applying the ophthalmic composition to a concave side of the contact lens. In some aspects, the methods can include applying the ophthalmic composition to a convex side of the contact lens.

In some embodiments, the methods can include applying a numbing composition to the eye prior, during, or after placement of the colorized contact lens on the eye, wherein the numbing composition may be the ophthalmic composition or separate composition.

In some embodiments, the methods can include: obtaining the contact lens in a clear solution, wherein the contact lens is invisible; applying the ophthalmic composition to the clear solution; and colorizing the contact lens with the ophthalmic composition so as to be visible.

In some embodiments, the method is performed by the subject installing the contact lens on their own eye.

In some aspects, the methods can include only temporarily colorizing the contact lens for a period of time, after which the contact lens becomes un-colorized.

In some embodiments, a method of removing a contact lens from an eye of a subject can include: applying an ophthalmic composition to the contact lens while located on the eye of the subject, wherein the ophthalmic composition includes a colorant that temporarily colorizes the contact lens; and removing the colorized contact lens from the eye while visualizing the colorized contact lens. In some aspects, the methods of removal can include one or more of the following: washing hands of the subject; touching the lens with a finger tip of the subject while a colorized contact lens is on the eye; opening the eye of the subject; looking at the eye of the subject having the colorized contact lens with a mirror; and removing the colorized contact lens from the eye. In some aspects, the methods of removal can include: viewing the contact lens on the eye when un-colorized; and colorizing the contact lens while on the eye.

In some embodiments, the methods of removal can include providing or obtaining or making the ophthalmic composition having the colorant. In some aspects, the methods of removal can include dispensing the ophthalmic composition from an ophthalmic composition dispensing container. In some aspects, the methods of removal can include the ophthalmic composition being configured as an eye drop configured to be applied directly to an eye.

In some embodiments, the methods of removal can include: placing the colorized contact lens in a contact lens carrier container; applying the ophthalmic composition to the colorized contact lens in the contact lens carrier container; and cleansing the coloring from the contact lens with the ophthalmic composition.

In some embodiments, the methods of removal can include: colorizing the contact lens while on the eye to locate a position of the contact lens; cleansing the colorant from the contact lens while on the eye while in the position; and removing the cleansed contact lens from the eye.

In some embodiments, the methods can include visually inspecting the colorized contact lens while in the eye.

In some embodiments, the methods of removal can include: obtaining a contact lens carrier container for receiving the colorized contact lens; and placing the colorized contact lens into the contact lens carrier container. In some aspects, the methods of removal can include: placing the colorized contact lens into a contact lens carrier container; and washing the contact lens in the contact lens carrier container. In some aspects, the methods of removal can include applying a washing ophthalmic composition to the contact lens while the contact lens is on a palm, fingertip, or other body portion of the subject.

In some embodiments, the methods of removal can include performing the method under guidance of an ophthalmic professional. In some aspects, the methods of removal can include performing the method under guidance of instructions provided with the ophthalmic composition. In some aspects, the methods of removal can include performing the method at home, office, restroom, or anywhere outside of an eye doctor's office.

In some embodiments, the methods of removal can include visually inspecting the contact lens for defects when the colorized contact lens is on or outside of the eye. In some aspects, the methods of removal can include discarding the colorized contact lens when visually determining a defect. In some aspects, the methods of removal can include retaining, saving, storing, or using the contact lens when visually determining the colorized contact lens to be substantially free of visibly determinable defects.

In some embodiments, the methods of removal can include using a light device to increase visibility of the colorized contact lens, such as within the eye. In some aspects, the methods of removal can include: shining a light on the colorized contact lens in the eye; and visualizing the colorized contact lens with the light. In some aspects, the methods of removal can include: determining a wavelength of light that illuminates the colorized contact lens; and shining the light having the illuminating wavelength on the colorized contact lens on the eye. In some aspects, the methods of removal can include: obtaining a light that emits a wavelength that illuminates the colorized contact lens; shining the light having the illuminating wavelength on the colorized contact lens on the eye; and visualizing the colorized contact lens with the light, the light having a wavelength of between 465-490 nm or 520-530 nm.

In some embodiments, the methods of removal can include applying a numbing composition to the eye prior or during removal of the colorized contact lens from the eye, wherein the numbing composition may be the ophthalmic composition or separate composition. In some aspects, the ophthalmic composition includes an anesthetic.

In some embodiments, the method is performed by the subject removing the contact lens from their own eye.

In some aspects, the methods of removal can include only temporarily colorizing the contact lens for a period of time, after which the contact lens becomes un-colorized.

As described herein, the colorant can be applied to the contact lens for improved visualization. This improved visualization can be obtained with standard or normal lighting, such as present in a doctor's office, home (e.g., bathroom or other room such as a room having a mirror), school, outside, or any place there is traditional white light or ambient light. The colorant, such as fluorescein or others, can be easily visualized in normal lighting. This allows the user to inspect the colorized contact lens without any special lighting or any specific wavelength of light. The colorant is provided to make the contact lens visible in many lighting conditions that are normally associated with places were a user will insert or remove the contact lens. For example, a bathroom light of any traditional lighting with a broad spectrum of wavelengths (e.g., normal white lighting) can be used along with the mirror for the viewing of the contact lens, insertion, or removal. However, specialty lights, such as a handheld, ring light, headlamp, or other may be used for the methods herein. Also, a light having a specific wavelength may be used for enhanced visualization, such as when the specific wavelength interacts with the colorant to present florescence or other enhanced coloring. While such a specialty light may be used with the colorized contact lenses, it should be recognized that the methods can be performed with traditional lighting and without specialty lighting.

Figure 1:
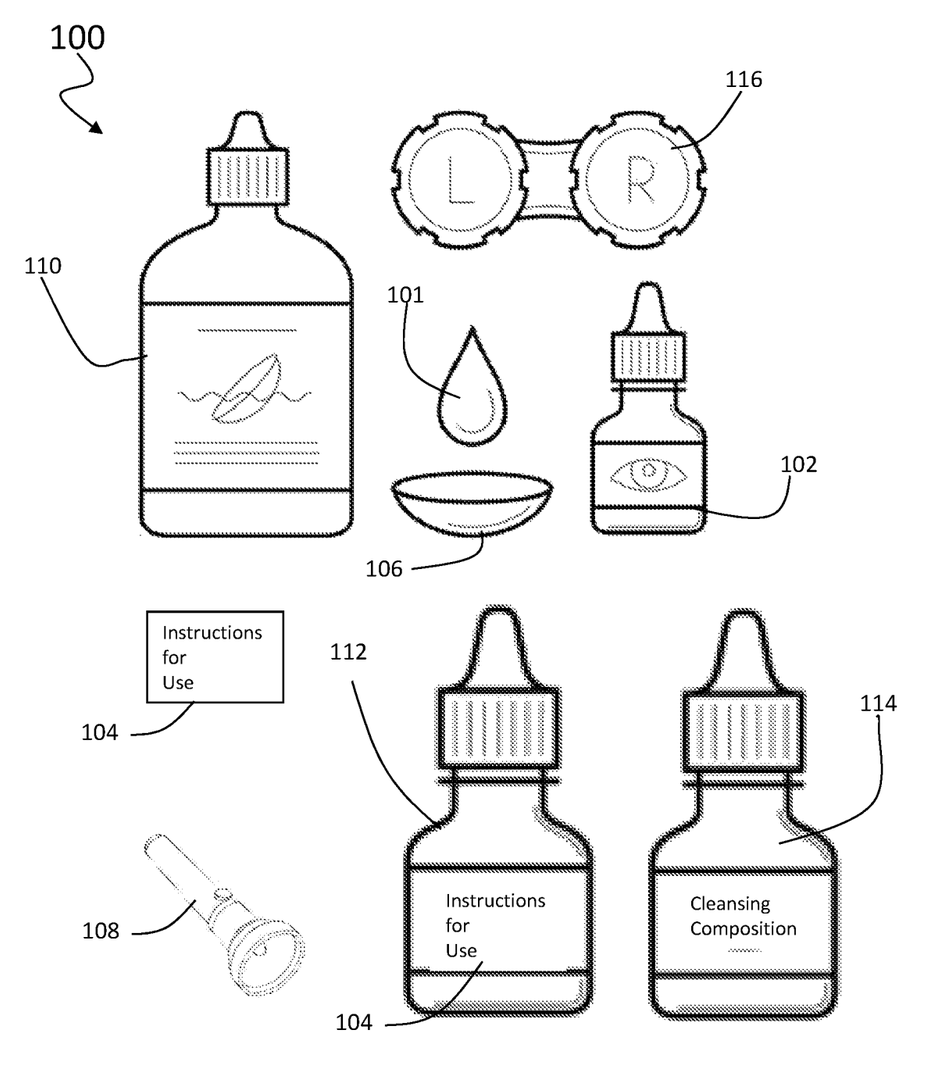
FIG. 1 shows a kit in accordance with an embodiment of the present invention.

FIG. 1 shows a kit 100 in accordance with the present invention. As shown, the kit 100 can include an ophthalmic composition 101 having a colorant in an eye drop dispensing container 102. The kit 100 can include instructions 104 for implementing a method for applying a colorized contact 106 on an eye or for removing a colorized contact 106 from an eye, or other method described herein. The kit 100 can include a light 108 that illuminates the colorant. The kit 100 can include a cleansing composition in an eye drop dispensing container 114, the cleansing composition being configured as an eye drop or a contact care composition. The kit 100 can include a contact cleansing container 110 for cleansing the colorized contact therein. In some aspects, the eye drop dispensing container 114 includes the instructions 104. The kit 100 can also include a contact lens carrying container 116, which may be adapted for storing and/or washing the contact lens.

As shown in FIG. 1, the light 108 is illustrated as a handheld light; however, any light can be used, such as any light FIGURES of any type of bulb. In some aspects, the light is a light bulb of any type, such as LED, halogen, or other that illuminates the colorant or otherwise improve visualization of the colorant. Alternatively, the light is configured as a ring light that fits on a finger to direct the light beam by pointing the finger. In another alternative, the light is configured as a headlamp light that fits on a head to direct the light beam by the direction of viewing.

In some embodiments, the kit can include a contact removal device, whether configured as a tweezer-like device or suction device or other. The contact removal device can be made of an ophthalmically suitable material, such as a silicone.

Definitions

The term "ophthalmic compositions" is understood by the skilled person and relates to a composition intended for use in relationship to the eye. In particular within the context of the current invention, the term "ophthalmic composition" comprises, and preferably consists of, contact lens care solutions and eye drops.

For this and other processes and methods disclosed herein, the operations performed in the processes and methods may be implemented in differing order. Furthermore, the outlined operations are only provided as examples, and some operations may be optional, combined into fewer operations, eliminated, supplemented with further operations, or expanded into additional operations, without detracting from the essence of the disclosed embodiments.

The present disclosure is not to be limited in terms of the particular embodiments described in this application, which are intended as illustrations of various aspects. Many modifications and variations can be made without departing from its spirit and scope. Functionally equivalent methods and apparatuses within the scope of the disclosure, in addition to those enumerated herein, are possible from the foregoing descriptions. Such modifications and variations are intended to fall within the scope of the appended claims. The present disclosure is to be limited only by the terms of the appended claims, along with the full scope of equivalents to which such claims are entitled. The terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

All references recited herein are incorporated herein by specific reference in their entirety.

The invention claimed is:

1. The method of applying a contact lens to an eye of a subject, the method comprising:
   obtaining the contact lens when un-colored;
   applying an ophthalmic composition to the contact lens while outside of the eye, wherein the ophthalmic composition includes a colorant that temporarily colorizes the contact lens outside of the eye;
   positioning the colorized contact lens onto a correct position of the eye while visualizing the colorized contact lens; and
   removing the colorant from the contact lens while on the eye of the subject.

2. The method of claim 1, further comprising one or more of the following:
   washing hands of the subject;
   placing the lens on a finger tip of the subject;
   opening the eye of the subject;
   looking at the eye of the subject with a mirror;
   looking up by the subject;
   placing the colorized contact lens on the eye;
   placing the colorized contact lens on a white portion of the eye;
   looking down;
   blinking after application of the colorized lens; and/or
   centering the colorized contact lens on the eye.

3. The method of claim 1, wherein the ophthalmic composition is configured as a contact lens care solution configured to be applied directly to a contact lens.

4. The method of claim 1, wherein the colorant is an azo colorant, arylmethane colorant, cyanine colorant, thiazine colorant, xanthene colorant, or combination thereof.

5. The method of claim 1, wherein the colorant is selected from trypan blue, diazine green, gentian violet, bromophenol blue, patent blue, brilliant blue, light green, fast green, indocyanine green or infracyanine green, methylene blue, toluidine blue, fluorescein, rose bengal, or combinations thereof.

6. The method of claim 1, wherein the colorant is fluorescein.

7. The method of claim 1, further comprising inspecting the contact lens before applying a contact lens to an eye of a subject, the method comprising:
   visually inspecting the colorized contact lens; and
   if the colorized contact lens is without damage, positioning the colorized contact lens onto a correct position of the eye while visualizing the colorized contact lens; or
   if the colorized contact lens is damaged, discarding the colorized contact lens.

8. The method of claim 1, further comprising:
   providing the un-colorized contact lens in a contact lens carrier container;
   applying the ophthalmic composition to the contact lens in the contact lens carrier container; and
   colorizing the contact lens with the ophthalmic composition in the contact lens carrier.

9. The method of claim 1, further comprising:
   providing the un-colorized contact lens in a contact lens carrier container;
   retrieving the un-colorized contact lens from the contact lens carrier container; and colorizing the contact lens outside of the contact lens carrier container.

10. The method of claim 1, further comprising:
visualizing the colorized contact lens on the eye after placement;
determining the colorized contact lens is improperly placed; and
relocating the colorized contact lens on the eye so as to be properly placed by visualization of the colorized contact lens.

11. A method for removing the contact lens from an eye of a subject, the method comprising:
providing the subject of claim 1 having the contact lens in the correct position of the eye;
applying an ophthalmic composition to the contact lens while located on the eye of the subject, wherein the ophthalmic composition includes a colorant that temporarily colorizes the contact lens while on the eye; and
removing the colorized contact lens from the eye while visualizing the colorized contact lens.

12. The method of claim 11, wherein the ophthalmic composition is configured as an eye drop configured to be applied directly to an eye from an ophthalmic composition dispensing container.

13. The method of claim 11, wherein the colorant is fluorescein.

14. The method of claim 11, further comprising:
visually inspecting the colorized contact lens while in the eye.

15. The method of claim 11, further comprising:
placing the colorized contact lens into a contact lens carrier container; and
washing the contact lens in the contact lens carrier container.

16. The method of claim 11, further comprising applying a washing ophthalmic composition to the contact lens while the contact lens is on a palm, fingertip, or other body portion of the subject.

17. The method of claim 11, further comprising visually inspecting the contact lens for defects when the colorized contact lens is on or outside of the eye, and then:
the colorized contact lens when visually determining a defect; or
retaining, saving, storing, or using the contact lens when visually determining the colorized contact lens to be substantially free of visibly determinable defects.

18. The method of claim 1, further comprising providing a kit comprising:
the ophthalmic composition having the colorant in an eye drop dispensing container; and
instructions for implementing a method for inspecting a colorized contact lens, applying a colorized contact on an eye, or for removing a colorized contact from an eye, wherein the colorized contact lens is colored with the ophthalmic composition having the colorant.

19. The kit of claim 18, wherein the colorant is selected from trypan blue, diazine green, gentian violet, bromophenol blue, patent blue, brilliant blue, light green, fast green, indocyanine green or infracyanine green, methylene blue, toluidine blue, fluorescein, rose bengal, or combinations thereof.

20. The method of claim 1, further comprising removing colorization from the contact lens while on the eye of the subject by blinking or application of a cleansing eye drop onto the contact lens.

* * * * *